(12) United States Patent
Hatanaka et al.

(10) Patent No.: US 10,179,481 B2
(45) Date of Patent: Jan. 15, 2019

(54) PNEUMATIC TIRE

(71) Applicant: BRIDGESTONE CORPORATION, Chuo-ku, Tokyo (JP)

(72) Inventors: Shintaro Hatanaka, Kodaira (JP); Isao Kuwayama, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/029,333

(22) PCT Filed: Jul. 1, 2014

(86) PCT No.: PCT/JP2014/003510
§ 371 (c)(1),
(2) Date: Apr. 14, 2016

(87) PCT Pub. No.: WO2015/063974
PCT Pub. Date: May 7, 2015

(65) Prior Publication Data
US 2016/0272007 A1    Sep. 22, 2016

(30) Foreign Application Priority Data

Oct. 29, 2013  (JP) ................................. 2013-224539

(51) Int. Cl.
*B60C 9/20* (2006.01)
*B60C 9/28* (2006.01)
(Continued)

(52) U.S. Cl.
CPC ................. *B60C 9/20* (2013.01); *B60C 9/02* (2013.01); *B60C 9/2009* (2013.01); *B60C 9/28* (2013.01);
(Continued)

(58) Field of Classification Search
CPC ........... B60C 9/20; B60C 9/02; B60C 9/2009; B60C 9/28; B60C 11/02; B60C 11/03
See application file for complete search history.

(56) References Cited

U.S. PATENT DOCUMENTS 4,258,769 A  *  3/1981  Makino ................... B61C 11/04
                                                                152/209.27
5,240,057 A     8/1993  Watanabe
(Continued)

FOREIGN PATENT DOCUMENTS

CN          102548775 A          7/2012
CN          103068594 A          4/2013
(Continued)

*Primary Examiner* — Jacob T Minskey
*Assistant Examiner* — Melody Tsui
(74) *Attorney, Agent, or Firm* — Kenja IP Law PC

(57) ABSTRACT

A pneumatic tire includes a tread portion, carcass, inclined belt, and circumferential belt. The inclined belt is formed by inclined belt layer(s) including cords inclined relative to the tire circumferential direction. A circumferential main groove is provided in the tread portion. The inclined belt includes a high-angle inclined belt layer in which the cords are at an inclination angle of 35° to 90° relative to the tire circumferential direction. In at least one tread half portion, an edge of the high-angle inclined belt layer in the tire width direction is positioned further outward in the tire width direction than the circumferential main groove disposed furthest outward in the tire width direction. The interval in the tire width direction from the edge to the center of the circumferential main groove is $0.2W_1$ to $0.35W_1$, where $W_1$ is the width of the high-angle inclined belt layer in the tire width direction.

12 Claims, 8 Drawing Sheets

(51) Int. Cl.
*B60C 9/02* (2006.01)
*B60C 11/03* (2006.01)
*B60C 15/00* (2006.01)
*B60C 11/02* (2006.01)
B60C 11/04 (2006.01)
B60C 9/22 (2006.01)

(52) U.S. Cl.
CPC .............. *B60C 11/02* (2013.01); *B60C 11/03* (2013.01); *B60C 15/00* (2013.01); *B60C 15/0036* (2013.01); *B60C 15/0045* (2013.01); *B60C 9/22* (2013.01); *B60C 11/04* (2013.01); *B60C 2009/2016* (2013.01); *B60C 2009/2019* (2013.01); *B60C 2009/2022* (2013.01); *B60C 2009/2233* (2013.01); *B60C 2009/2261* (2013.01); *B60C 2009/2266* (2013.01); *B60C 2011/0353* (2013.01)

(56) References Cited

U.S. PATENT DOCUMENTS

| 2002/0062895 | A1* | 5/2002 | Nakasai | B60C 9/20 |
| | | | | 152/526 |
| 2007/0113946 | A1* | 5/2007 | Manno | B60C 9/2006 |
| | | | | 152/531 |
| 2013/0168000 | A1* | 7/2013 | Kuwayama | B60C 3/04 |
| | | | | 152/453 |
| 2014/0326380 | A1 | 11/2014 | Kotoku et al. | |

FOREIGN PATENT DOCUMENTS

| CN | 103298631 A | 9/2013 | |
| EP | 1852276 A1 | 11/2007 | |
| EP | 2463119 A1 | 6/2012 | |
| EP | 2781366 A1 | 9/2014 | |
| EP | 2982518 A1 | 2/2016 | |
| JP | 2001-301421 A | 10/2001 | |
| JP | 2001301421 A * | 10/2001 | |
| JP | 2006-193032 A | 7/2006 | |
| JP | 2009-012547 A | 1/2009 | |
| JP | 2011016338 A * | 1/2011 | |
| JP | WO 2011161854 A1 * | 12/2011 | ............... B60C 3/04 |
| JP | 2012-020673 A | 2/2012 | |
| JP | 2012020673 A * | 2/2012 | |
| JP | 2012020673 A * | 2/2012 | |
| JP | 2012-171423 A | 9/2012 | |
| WO | WO-2011161854 A1 * | 12/2011 | ............... B60C 3/04 |
| WO | 2012/066725 A1 | 5/2012 | |
| WO | 2013042256 A1 | 3/2013 | |
| WO | 2013065318 A1 | 5/2013 | |

* cited by examiner

PNEUMATIC TIRE

CROSS-REFERENCE TO RELATED APPLICATION

This application claims priority to and the benefit of Japanese Patent Application No. 2013-224539 filed Oct. 29, 2013, the entire contents of which are incorporated herein by reference.

TECHNICAL FIELD

This disclosure relates to a pneumatic tire.

BACKGROUND

One known way of reinforcing a pneumatic tire is to dispose, at the outer side in the tire radial direction of the crown portion of the carcass extending between bead portions, an inclined belt layer including cords extending at an inclination relative to the tire circumferential direction and a circumferential belt layer including cords extending along the tire circumferential direction.

In other words, the tire is reinforced for example by using the inclined belt layer to ensure rigidity in the tire width direction and to yield cornering power, which is one important index of steering stability, and by using the circumferential belt layer to ensure rigidity in the tire circumferential direction and suppress radial growth of the tire when driving at high speed.

In general, since a tire with larger cornering power has excellent steering stability, it is desirable to increase cornering power. Increasing the rigidity of the inclined belt layer in the tire width direction is an effective way of increasing cornering power. Specifically, steeply inclining the cords in the inclined belt layer relative to the tire circumferential direction is one possible approach.

SUMMARY

Technical Problem

In a tire provided with an inclined belt layer including cords greatly inclined relative to the tire circumferential direction, a large cornering power is generated under the condition of driving with the tire at a relatively large slip angle. Conversely, under the condition of driving with a relatively small slip angle, the amount of increase in the cornering power is smaller than when the slip angle is large, and there is demand for improvement on this point.

It would therefore be helpful to provide a pneumatic tire that reliably increases cornering power under various driving conditions in which the slip angle of the tire changes.

Solution to Problem

In order to resolve the above-described problem, our pneumatic tire comprises a pair of bead portions; a tread portion; a carcass extending between the pair of bead portions; an inclined belt provided at an outer side of a crown portion of the carcass in a tire radial direction and formed by one or more inclined belt layers including cords that are inclined relative to a tire circumferential direction; and a circumferential belt provided at the outer side of the crown portion of the carcass in the tire radial direction and formed by one or more circumferential belt layers including cords that extend along the tire circumferential direction; wherein one or more circumferential main grooves extending along the tire circumferential direction are formed on a surface of the tread portion; as the one or more inclined belt layers, the inclined belt includes a high-angle inclined belt layer in which the cords are at an inclination angle of 35° or more to 90° or less relative to the tire circumferential direction; and in at least one tread half portion, an edge of the high-angle inclined belt layer in a tire width direction is positioned further outward in the tire width direction than a circumferential main groove disposed furthest outward in the tire width direction, and an interval in the tire width direction from a center of the circumferential main groove to the edge is $0.2W_1$ or more to $0.35W_1$ or less, where $W_1$ is a width of the high-angle inclined belt layer in the tire width direction. According to this structure, the cornering power can be increased under various driving conditions in which the slip angle of the tire changes. The tread half portions are the pair of regions defined by the tire equator and the tread edges.

The tire of this disclosure is used by being attached to an applicable rim. The "applicable rim" is an industrial standard effective in the region where the tire is manufactured and used and refers to a standard rim at an applicable size as described in the JATMA YEAR BOOK in Japan, the ETRTO STANDARDS MANUAL in Europe, the TRA YEAR BOOK in the United States of America, or the like (specifically the Measuring Rim in the ETRTO STANDARDS MANUAL and the Design Rim in the TRA YEAR BOOK).

In this disclosure, the tire width direction and the like of the inclined belt layer and the circumferential belt layer is measured when the tire is mounted on the applicable rim, air pressure corresponding to the maximum load capability in the applicable size/ply rating described in JATMA or the like ("predetermined air pressure") is applied, and no load is applied.

In our pneumatic tire, the circumferential belt preferably has a higher tire circumferential direction rigidity per unit width in a central region including a tire equator than in a region on an outer side of the central region in the tire width direction. As used herein, the phrase "cords extending along the tire circumferential direction" includes not only the case of the cords being parallel to the tire circumferential direction, but also the case of the cords being slightly inclined relative to the tire circumferential direction (at an inclination angle of less than 5°) for example due to forming the belt layer by spirally winding strips of rubber-coated cords. According to this structure, the noise performance can be improved while increasing the cornering power and maintaining the rolling resistance performance.

Our pneumatic tire preferably comprises two of the circumferential belt layers in the central region and one of the circumferential belt layers in a region on an outer side of the central region in the tire width direction. According to this structure, an increase in manufacturing costs and in tire weight can be suppressed while maintaining noise performance.

In our pneumatic tire, as the one or more inclined belt layers, the inclined belt preferably further includes a low-angle inclined belt layer in which the cords are at an inclination angle that is smaller than the inclination angle of the cords in the high-angle inclined belt layer and is 30° or less relative to the tire circumferential direction; and a width of the low-angle inclined belt layer in the tire width direction is preferably $0.6W_1$ or less. According to this structure, the noise performance can be improved while increasing the cornering power.

In our pneumatic tire, as the inclined belt layers, the inclined belt preferably includes only one layer of the high-angle inclined belt layer and one layer of the low-angle inclined belt layer. According to this structure, an increase in manufacturing costs and in tire weight can be suppressed while maintaining noise performance.

In our pneumatic tire, X is preferably 700 or less when X=Ymn, where Y is Young's modulus of the cords in the one or more circumferential belt layers in GPa, m is the number of layers of the one or more circumferential belt layers, and n is the number of cords implanted per 50 mm. This structure contributes to the effect of increasing the cornering power under a variety of driving conditions in which the slip angle of the tire changes and can also reduce manufacturing costs.

Advantageous Effect

According to this disclosure, a pneumatic tire with increased cornering power at a variety of slip angles can be provided.

DETAILED DESCRIPTION

The following describes embodiments of this disclosure with reference to the drawings.

Figure 1:
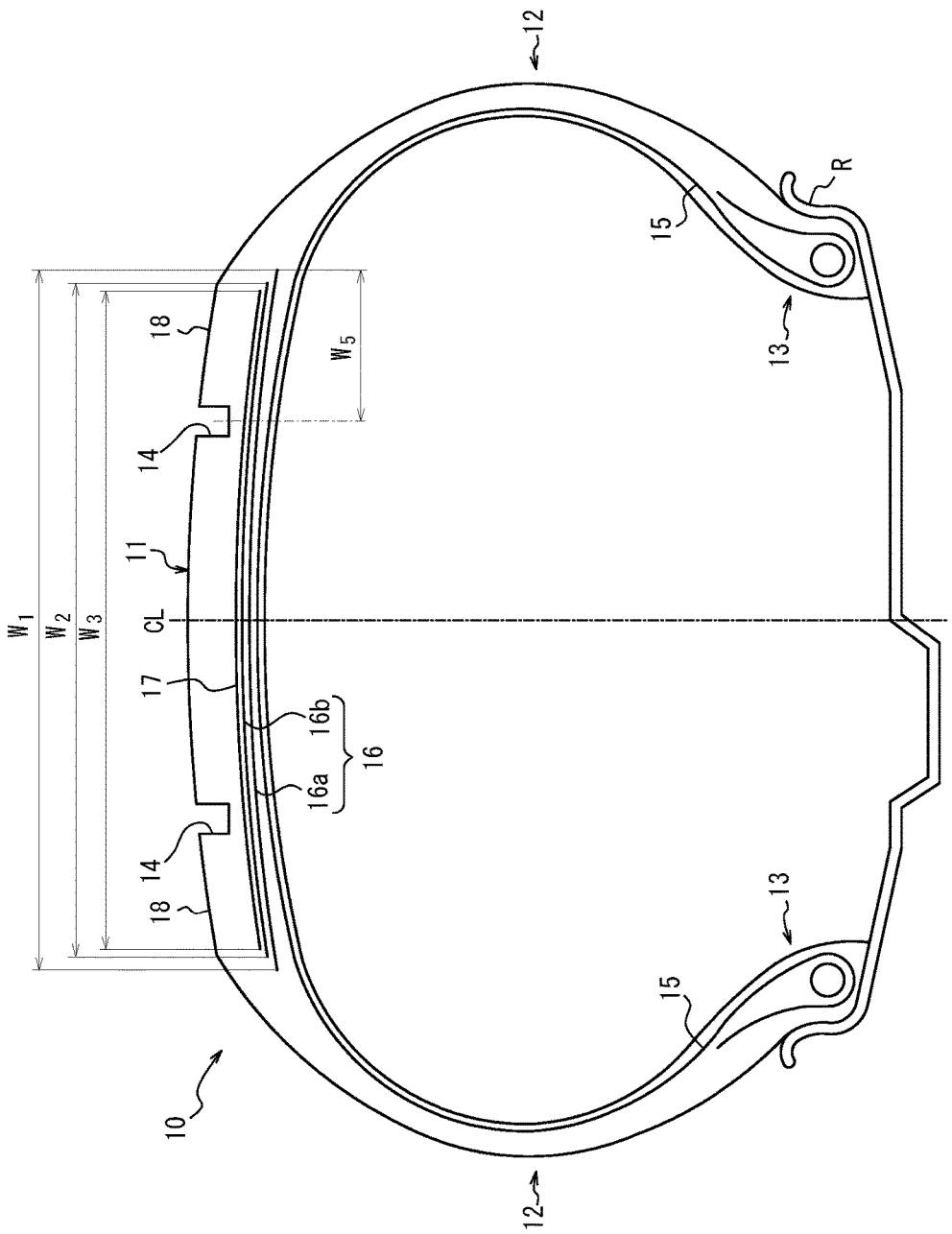
FIG. 1 is a cross-sectional diagram in the tire width direction of a pneumatic tire according to Embodiment 1.

First, a pneumatic tire according to Embodiment 1 is described. FIG. 1 is a cross-sectional diagram in the tire width direction of a pneumatic tire according to this embodiment. The pneumatic tire 10 is used by being attached to an applicable rim R.

As illustrated in FIG. 1, the pneumatic tire 10 includes a tread portion 11, sidewall portions 12 extending inward in the tire radial direction from the sides of the tread portion 11, and a bead portion 13 continuing from each sidewall portion 12 inward in the tire radial direction. One or more circumferential main grooves 14 extending along the tire equator CL are formed on the surface of the tread portion 11. While it suffices to provide the circumferential main grooves 14 on either one of the tread half portions bordered by the tire equator CL, one may be provided in each tread half portion for a total of two circumferential main grooves, or three or more may be provided.

The pneumatic tire 10 also includes a carcass 15 extending between the pair of bead portions 13, an inclined belt 16, and a circumferential belt 17.

The inclined belt 16 is disposed at the outer side of a crown portion of the carcass 15 in the tire radial direction. The inclined belt 16 is formed by one or more inclined belt layers including cords inclined relative to the tire circumferential direction. In this embodiment, as the one or more inclined belt layers, the inclined belt 16 includes a first high-angle inclined belt layer 16a. An inclination angle of the cords in the first high-angle inclined belt layer 16a relative to the tire circumferential direction is 35° or more to 90° or less. The inclination angle is more preferably 50° or more.

By setting the inclination angle of the cords to be 35° or more, the circumferential expansion of rubber increases when the surface of the tread portion 11 deforms, thereby sufficiently ensuring the ground contact length of the tire. As a result, the cornering power increases, yielding high turning performance. Furthermore, if the inclination angle is 50° or more, the cornering power can be further increased.

Furthermore, in the inclined belt 16, the edge of the first high-angle inclined belt layer 16a in the tire width direction is positioned further outward in the tire width direction than the circumferential main groove 14 disposed furthest outward in the tire width direction in the tread half portion bordered by the tire equator CL. Also, the interval $W_5$ in the tire width direction from the edge of the first high-angle inclined belt layer 16a in the tire width direction to the center of the circumferential main groove 14 is $0.2W_1$ or more to $0.35W_1$ or less, where $W_1$ is the width of the first high-angle inclined belt layer 16a in the tire width direction. By setting the interval $W_5$ to satisfy this condition, a wide shoulder land portion 18 is formed on the surface of the tread portion 11. When the inclined belt 16 includes a plurality of high-angle inclined belt layers, then the edge, in the tire width direction, of the entire high-angle inclined belt in which all of the high-angle inclined belt layers are overlapped is positioned further outward in the tire width direction than the circumferential main groove 14 disposed furthest outward in the tread half portion bordered by the tire equator CL, and the interval $W_5$ in the tire width direction from the edge to the center of the circumferential main groove 14 is $0.2W_1$ or more to $0.35W_1$ or less, where $W_1$ is the width of the entire high-angle inclined belt in the tire width direction.

By forming the above-described wide shoulder land portion 18 on the surface of the tread portion 11, the cornering power is increased, and a high turning performance is obtained, even under a driving condition with a relatively small slip angle. This effect is described below.

Under a driving condition with a relatively small slip angle, the in-plane flexural rigidity of the first high-angle inclined belt layer 16a in the tire width direction decreases due to the first high-angle inclined belt layer 16a including cords with the above-mentioned inclination angle. For this reason, the shear force produced between the tread rubber and the inclined belt 16 decreases, and the effect of increasing the cornering power by including the above-mentioned inclination angle is reduced under a driving condition with a relatively small slip angle. Therefore, by forming the wide shoulder land portion 18 as described above, the rigidity of the shoulder land portion 18 in the tire width direction increases, and the in-plane flexure of the inclined belt 16 decreases. Accordingly, the shear force produced between the tread rubber and the inclined belt 16 increases, thereby increasing the cornering power.

In particular, by setting the interval $W_5$ from the edge of the first high-angle inclined belt layer 16a to the center of the circumferential main groove 17 to be $0.2W_1$ or more, the cornering power can be sufficiently increased and rigidity in the tire width direction can be obtained under a driving condition with a relatively small slip angle. Furthermore, setting the interval $W_5$ to be $0.35W_1$ or less allows suppression of the reduction in cornering power due to the ground contact length of the tire shortening through the occurrence of buckling.

In the inclined belt 16, the width of the first high-angle inclined belt layer 16a in the tire width direction is preferably 60% or more of the width of the carcass 15 in the tire width direction in order to increase durability of the tire. Furthermore, setting the width of the first high-angle inclined belt layer 16a in the tire width direction to be greater than the ground contact width of the tread portion 11 is preferable in order to further increase durability of the tire.

As the one or more inclined belt layers, the inclined belt 16 preferably includes a second high-angle inclined belt layer 16b, as in the embodiment in FIG. 1. The second high-angle inclined belt layer 16b is disposed further outward in the tire radial direction than the first high-angle inclined belt layer 16a. The second high-angle inclined belt layer 16b may be disposed between the carcass 15 and the first high-angle inclined belt layer 16a. In this embodiment, the inclination angle of the cords in the second high-angle inclined belt layer 16b relative to the tire circumferential direction is 35° or more to 90° or less.

Figure 2:
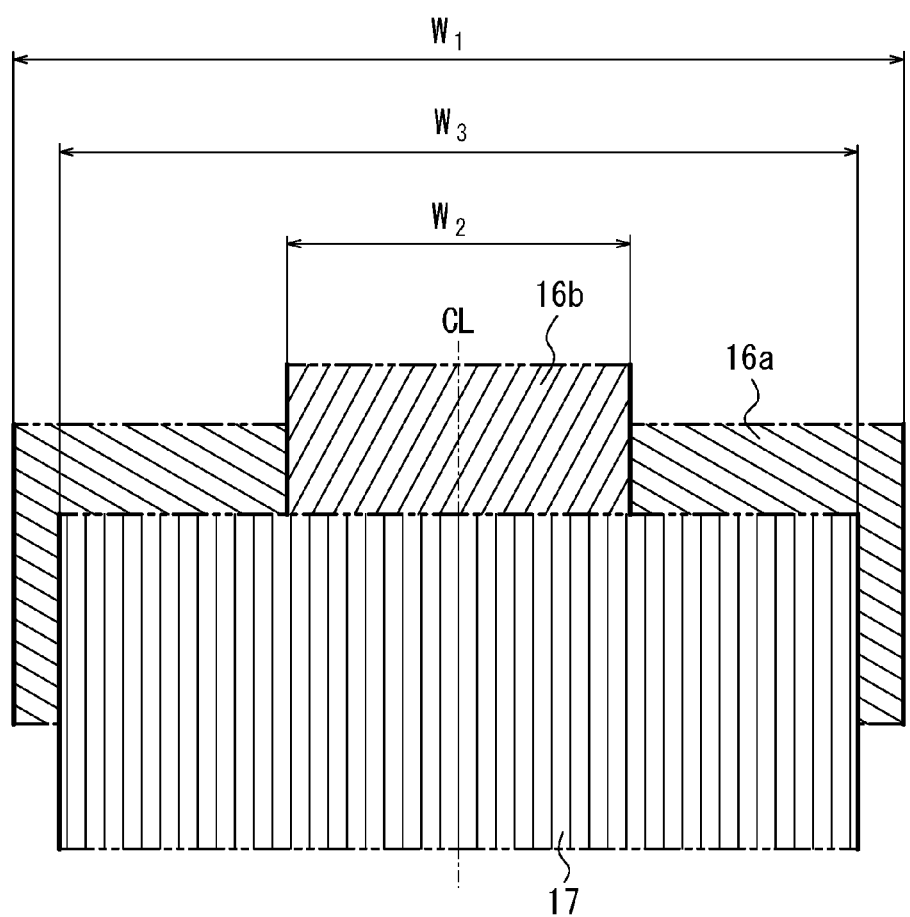
FIG. 2 illustrates an example of the belt structure in the tire illustrated in FIG. 1.

As illustrated in FIG. 2, the cords in the second high-angle inclined belt layer 16b intersect the cords in the first high-angle inclined belt layer 16a so as to sandwich the tire equator CL therebetween. According to this structure, a shear force acts between the two high-angle inclined belt layers 16a and 16b when the vehicle corners, and the cornering power can be further improved.

Figure 3:
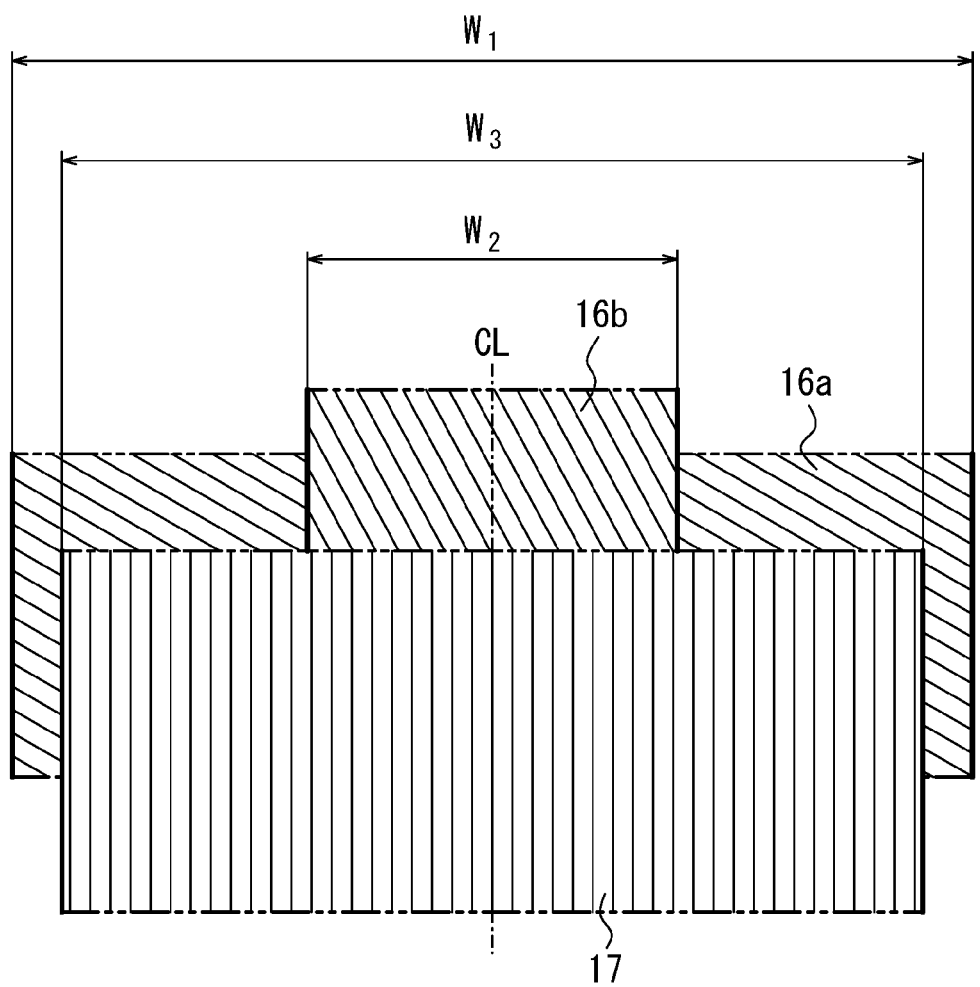
FIG. 3 illustrates another example of the belt structure in the tire illustrated in FIG. 1.

As illustrated in FIG. 3, the cords in the second high-angle inclined belt layer 16b may be inclined relative to the tire equator CL in the same direction as the cords in the first high-angle inclined belt layer 16a. According to this structure, the shear force that acts between the two high-angle inclined belt layers 16a and 16b decreases, allowing a reduction in rolling resistance.

The circumferential belt 17 is disposed at the outer side of the crown portion of the carcass 15 in the tire radial direction, preferably at the outer side of the inclined belt 16 in the tire radial direction. The circumferential belt 17 has cords extending along the tire circumferential direction and is formed by one or more circumferential belt layers. X is preferably 700 or less when X=Ymn, where Y (GPa) is Young's modulus of the cords in the one or more circumferential belt layers, m is the number of layers of the one or more circumferential belt layers, and n is the number of cords implanted per 50 mm.

Setting X to be 700 or less can appropriately reduce the tensile strength of the circumferential belt layers and contribute to the effect of increasing cornering power under a variety of driving conditions in which the slip angle of the tire changes. Adopting a circumferential belt with a small tensile strength can also reduce manufacturing costs.

The cords in the carcass 15, the inclined belt 16, and the circumferential belt 17 may, for example, be organic fiber cords made of aramid, polyethylene terephthalate, polyethylene naphthalate, or the like, or steel cords.

Next, Embodiment 2 is described. In Embodiment 2, the structure of the circumferential belt differs from that of Embodiment 1. The following describes Embodiment 2, focusing on the differences from Embodiment 1. Portions having the same structure as in Embodiment 1 are labeled with the same reference signs.

Figure 4:
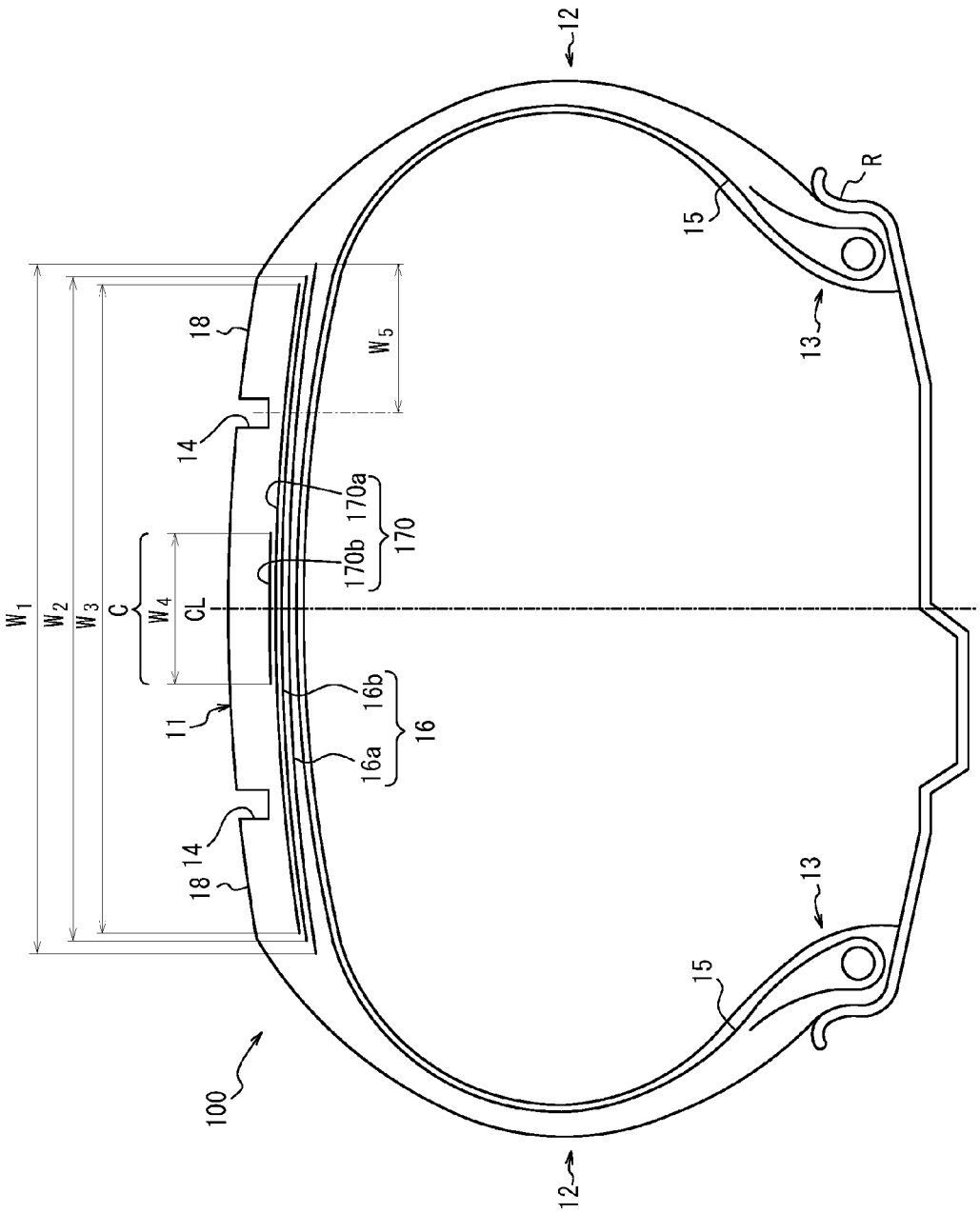
FIG. 4 is a cross-sectional diagram in the tire width direction of a pneumatic tire according to Embodiment 2.

In a pneumatic tire 100 in Embodiment 2 (see FIG. 4), the structure of the tread portion 11, sidewall portions 12, bead portions 13, carcass 15, and inclined belt 16 and the positions at which the circumferential main grooves 14 are disposed are the same as in Embodiment 1.

Accordingly, as in Embodiment 1, the cornering power increases and high turning performance is obtained under a variety of driving conditions in which the slip angle of the tire changes.

In the pneumatic tire 100, a circumferential belt 170 includes a wide circumferential belt layer 170a and a narrow circumferential belt layer 170b as the circumferential belt layers. The narrow circumferential belt layer 170b is preferably disposed further outward in the tire radial direction than the wide circumferential belt layer 170a.

A high-rigidity region is formed by overlap between two layers, i.e. the wide circumferential belt layer 170a and the narrow circumferential belt layer 170b, in a central region C, in the tire width direction, that includes the tire equator CL. Whereas two circumferential belt layers are provided in the central region C, one circumferential belt layer is provided in regions on the outer sides of the central region C in the tire width direction. Therefore, the tire circumferential direction rigidity per unit width is higher in the central region C than in the regions on the outer sides of the central region C in the tire width direction. A width $W_4$ in the tire width direction of the central region C, where the high-rigidity region is formed, is $0.2W_3$ or more to $0.6W_3$ or less, where $W_3$ is the width of the circumferential belt 170 in the tire width direction, i.e. the width of the wide circumferential belt layer 170a in the tire width direction in this example.

By forming the high-rigidity region, the noise performance can be improved. This effect is described below.

Figure 5:
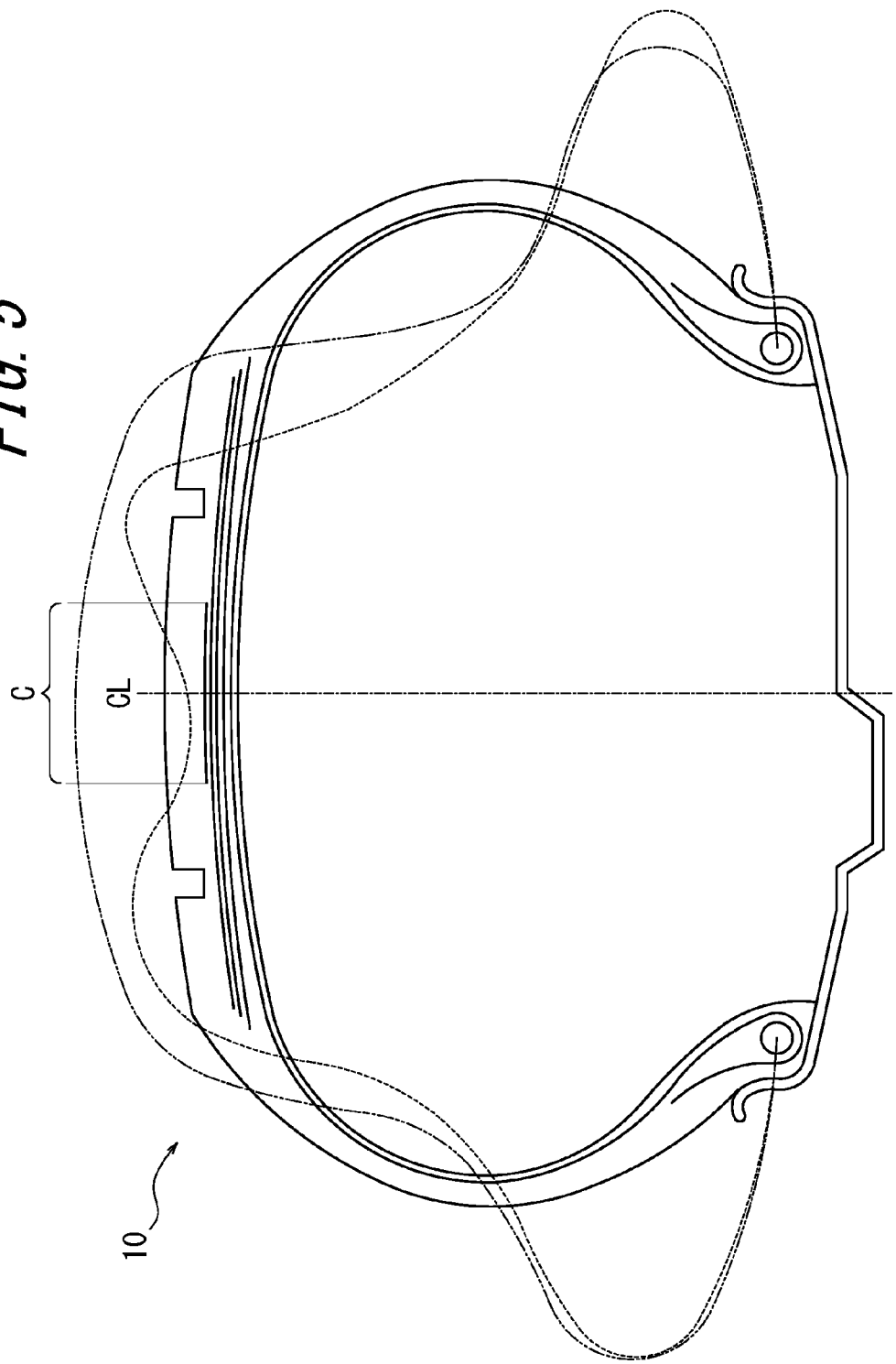
FIG. 5 illustrates the effects of the pneumatic tire according to Embodiment 2.

A tire in which the cords in the inclined belt layer have a large inclination angle relative to the tire circumferential direction, for example 35° or more as in this embodiment, has a shape (see the dash-double dot line in FIG. 5) such that the tread surface uniformly undergoes significant vibration in the high frequency range of 400 Hz to 2 kHz in the primary, secondary or ternary vibration modes in the cross-sectional direction, thereby causing a large noise emission. Therefore, forming the high-rigidity region to locally increase the circumferential rigidity of the central region C makes the central region of the tread portion 11 in the tire width direction less prone to expansion in the tire radial direction. As a result, the expansion of the tread surface in the tire radial direction is suppressed (see the dashed line in FIG. 5), and noise emission is reduced. In particular, setting the width $W_4$ of the central region C in the tire width direction to be $0.2W_3$ or greater allows the required noise performance to be satisfied.

Furthermore, setting the width $W_4$ of the central region C in the tire width direction to be $0.6W_3$ or less allows suppression of the occurrence of a vibration mode in which the entire tread portion 11 vibrates due to the high-rigidity region being too wide, allows suppression of noise emission due to this vibration mode, and allows suppression of an increase in tire weight.

Forming the high-rigidity region by setting the number of circumferential belt layers to two layers in the central region C and one layer in regions on the outer sides of the central region C in the tire width direction also allows suppression of an increase in manufacturing costs and tire weight while maintaining noise performance.

The wide circumferential belt layer 170a preferably has a smaller width in the tire width direction than the width of the high-angle inclined belt layer, i.e. the wider first high-angle inclined belt layer 16a in this example. According to this structure, the wide circumferential belt layer 170a and the carcass 15 are prevented from being adjacent in the tire radial direction, and when the tread portion 11 contacts the ground, strain can be suppressed between the carcass 15, which acts to expand in the tire radial direction, and the wide circumferential belt layer 170a, which acts to suppress expansion in the tire circumferential direction. By suppressing strain between the carcass 15 and the wide circumferential belt layer 170a, deterioration of rolling resistance is suppressed.

Alternatively, the wide circumferential belt layer 170a may have a larger width in the tire width direction than that of the first high-angle inclined belt layer 16a, and the interval from the edge of the wide circumferential belt layer 170a in the tire width direction to the edge of the first high-angle inclined belt layer 16a in the tire width direction may be 5 mm or greater.

By the wide circumferential belt layer 170a and the first high-angle inclined belt layer 16a satisfying the above-described relationship, belt edge separation of the inclined belt is suppressed.

Next, Embodiment 3 is described. In Embodiment 3, the structure of the circumferential belt differs from that of Embodiment 1. The following describes Embodiment 3, focusing on the differences from Embodiment 1. Portions having the same structure as in Embodiments 1 and 2 are labeled with the same reference signs.

Figure 6:
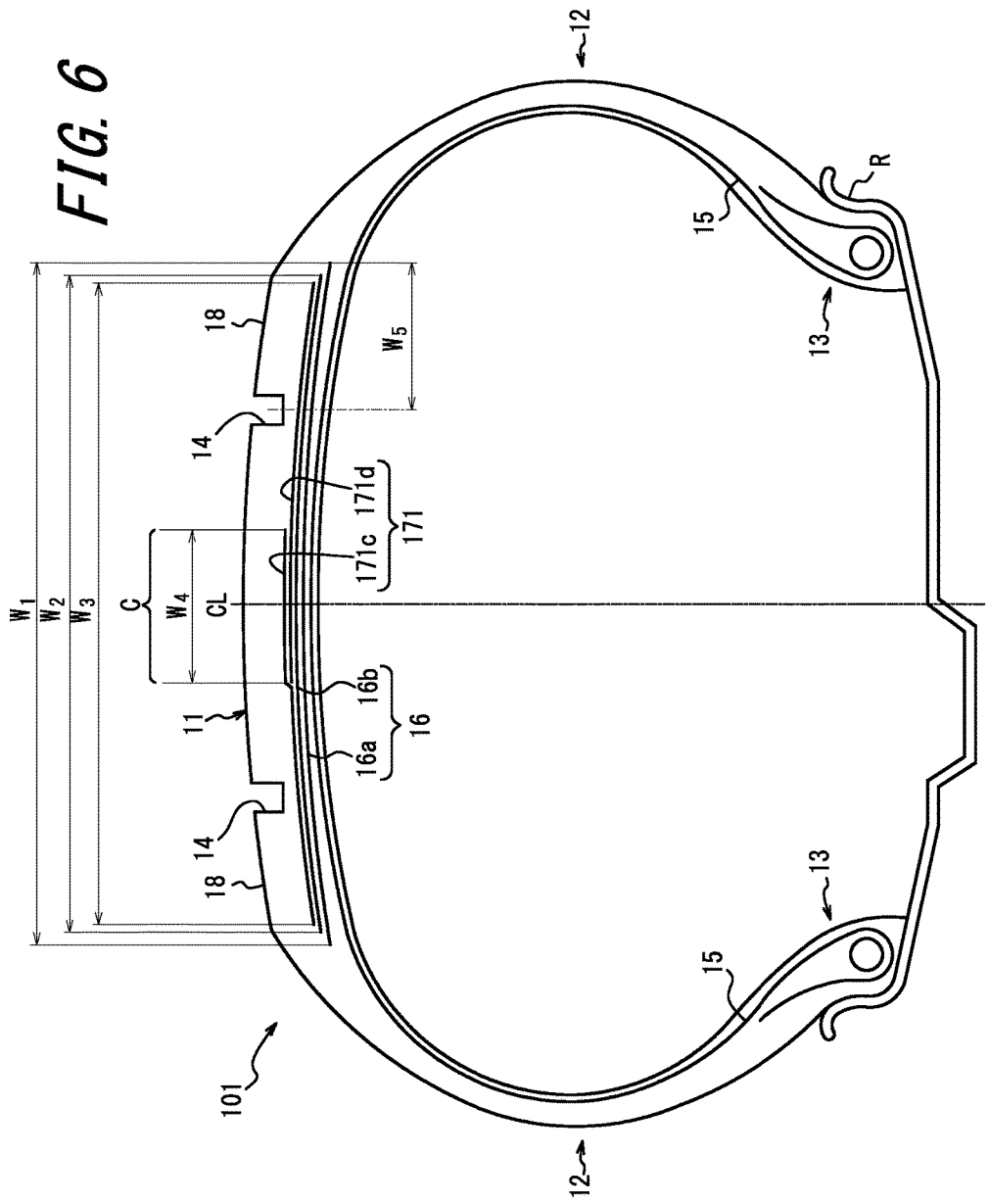
FIG. 6 is a cross-sectional diagram in the tire width direction of a pneumatic tire according to Embodiment 3.

In a pneumatic tire 101 in Embodiment 3 (see FIG. 6), the structure of the tread portion 11, sidewall portions 12, bead portions 13, carcass 15, and inclined belt 16 and the positions at which the circumferential main grooves 14 are disposed are the same as in Embodiment 1.

Accordingly, as in Embodiment 1, the cornering power increases and high turning performance is obtained reliably under a variety of driving conditions in which the slip angle of the tire changes.

In the pneumatic tire 101, a circumferential belt 171 includes a first circumferential belt layer 171c and a second circumferential belt layer 171d that are split up in the tire width direction as the circumferential belt layers. A high-rigidity region is formed by the first circumferential belt layer 171c and the second circumferential belt layer 171d overlapping in the central region C. Whereas two circumferential belt layers are provided in the central region C, one circumferential belt layer is provided in regions on the outer sides of the central region C in the tire width direction. Therefore, the tire circumferential direction rigidity per unit width is higher in the central region C than in the regions on the outer sides of the central region C in the tire width direction. As in Embodiment 2, the width $W_4$ in the tire width direction of the central region C is preferably $0.2W_3$ or more to $0.6W_3$ or less, where $W_3$ is the width of the circumferential belt 171 in the tire width direction.

Accordingly, as in Embodiment 2, by forming the high-rigidity region, the noise performance can be improved.

Forming the high-rigidity region by setting the number of circumferential belt layers to two layers in the central region C and one layer in regions on the outer sides of the central region C in the tire width direction also allows suppression of an increase in manufacturing costs and tire weight while maintaining noise performance.

Next, Embodiment 4 is described. In Embodiment 4, the structure of the circumferential belt differs from that of Embodiment 1. The following describes Embodiment 4, focusing on the differences from Embodiment 1. Portions having the same structure as in Embodiments 1 to 3 are labeled with the same reference signs.

Figure 7:
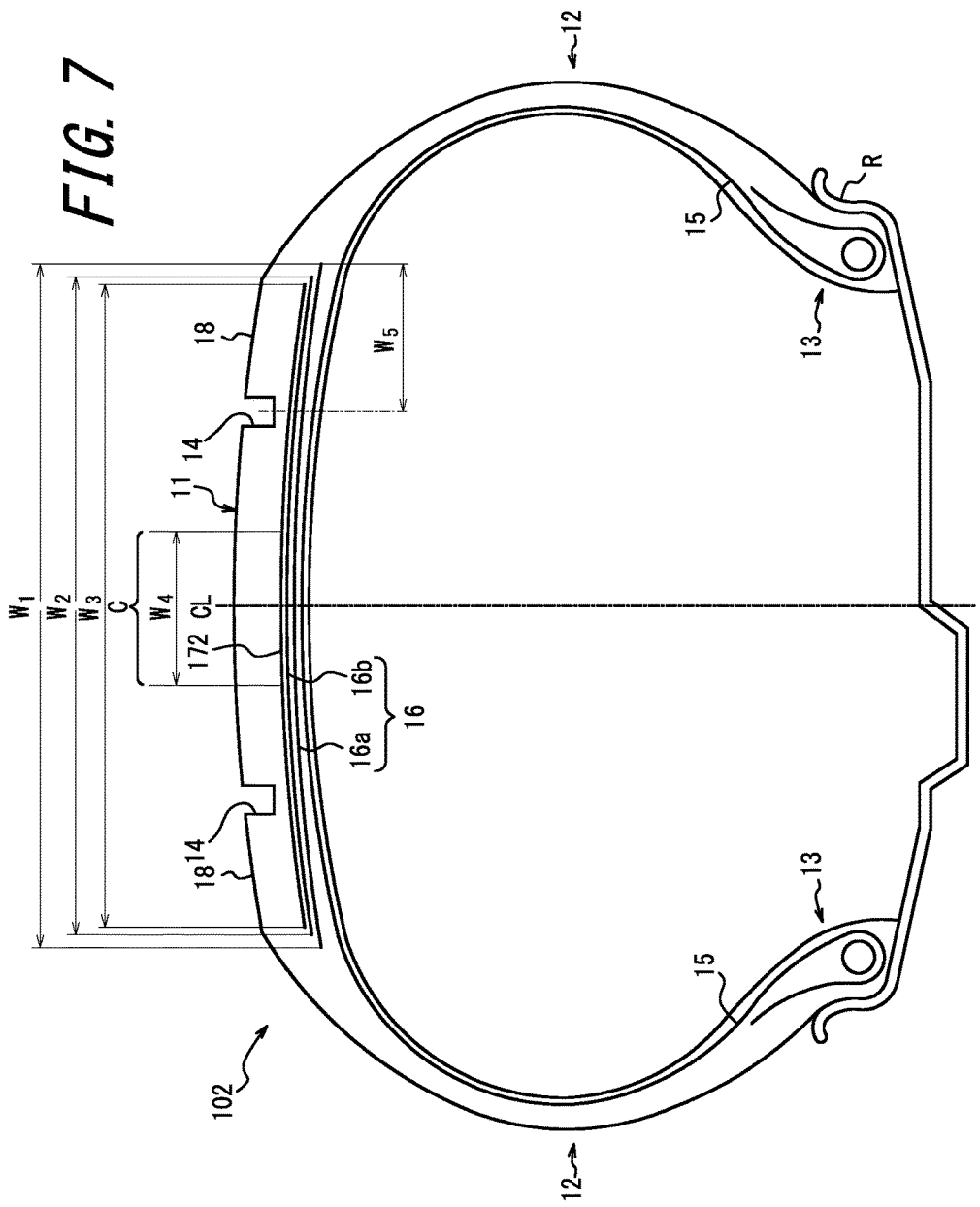
FIG. 7 is a cross-sectional diagram in the tire width direction of a pneumatic tire according to Embodiment 4.

In a pneumatic tire 102 in Embodiment 3 (see FIG. 7), the structure of the tread portion 11, sidewall portions 12, bead portions 13, carcass 15, and inclined belt 16 and the positions at which the circumferential main grooves 14 are disposed are the same as in Embodiment 1.

Accordingly, as in Embodiment 1, the cornering power increases and high turning performance is obtained under a variety of driving conditions in which the slip angle of the tire changes.

In the pneumatic tire 102, a circumferential belt 172 includes one circumferential belt layer as the one or more circumferential belt layers. In this circumferential belt layer, a high-rigidity region is formed by disposing, in the central region C, cords with a higher rigidity than the cords in the regions on the outer sides of the central region C in the tire width direction. By locally increasing at least one of Young's modulus of the cords and the number of cords implanted, the circumferential rigidity can be increased in the central region. Young's modulus can be adjusted by changing the material of the cords, the twist structure, or the like. According to this structure, the rigidity in the tire circumferential direction is greater in the central region C than in the regions further outward than the central region C in the tire width direction. As in Embodiment 2, the width $W_4$ in the tire width direction of the central region C is preferably $0.2W_3$ or more to $0.6W_3$ or less, where $W_3$ is the width of the circumferential belt 171 in the tire width direction.

Accordingly, as in Embodiment 2, by forming the high-rigidity region, the noise performance can be improved.

Next, Embodiment 5 is described. In Embodiment 5, the structure of the inclined belt differs from that of Embodiment 1. The following describes Embodiment 5, focusing on the differences from Embodiment 1. Portions having the same structure as in Embodiments 1 to 4 are labeled with the same reference signs.

Figure 8:
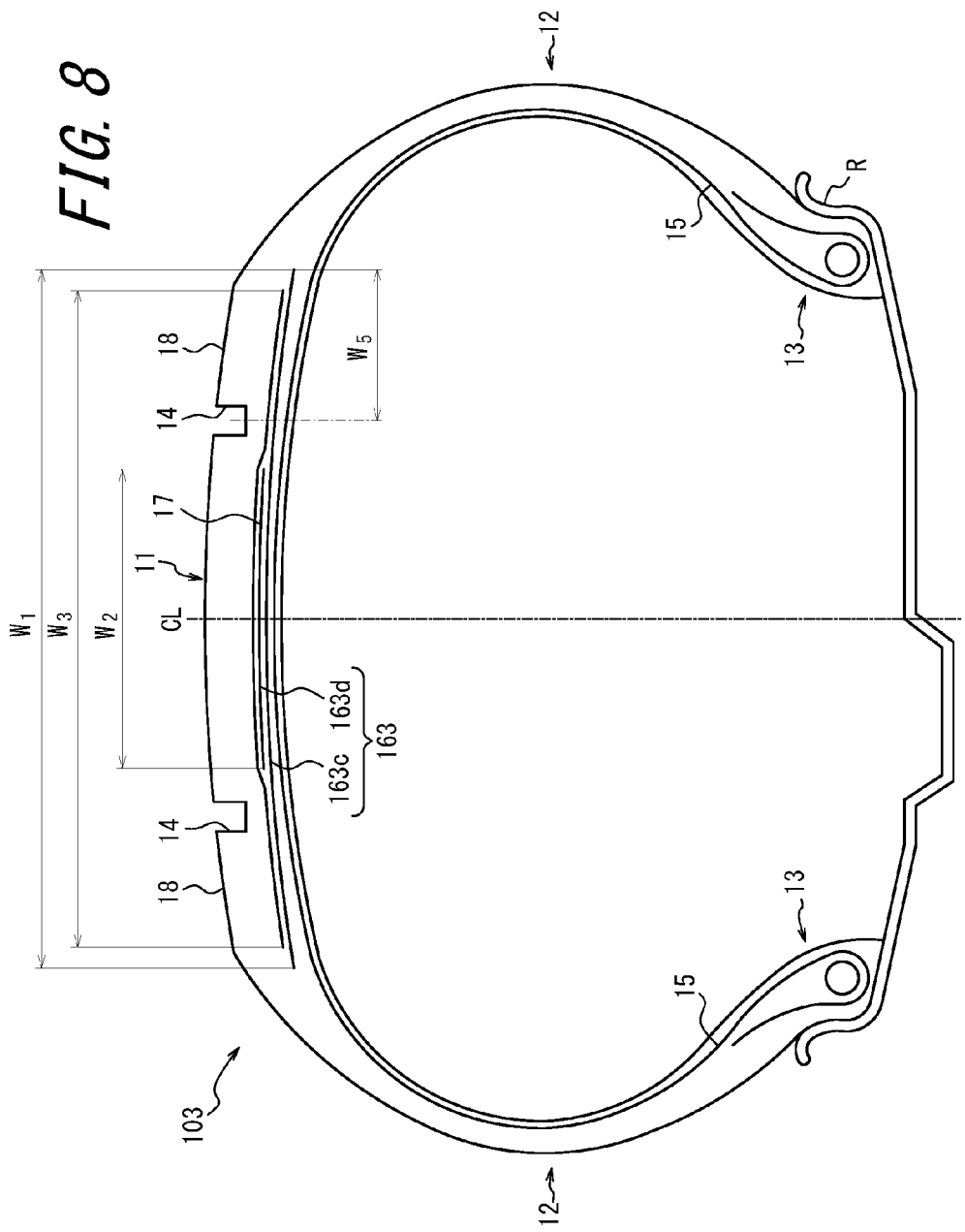
FIG. 8 is a cross-sectional diagram in the tire width direction of a pneumatic tire according to Embodiment 5.

In a pneumatic tire 103 in Embodiment 5 (see FIG. 8), the structure of the tread portion 11, sidewall portions 12, bead portions 13, carcass 15, and circumferential belt 17 and the positions at which the circumferential main grooves 14 are disposed are the same as in Embodiment 1.

In the pneumatic tire 103, as the inclined belt layers, the inclined belt 163 includes at least one high-angle inclined belt layer 163c and at least one low-angle inclined belt layer 163d. The inclined belt layers are preferably constituted by only one high-angle inclined belt layer and one low-angle inclined belt layer.

Constituting the inclined belt layers with only one high-angle inclined belt layer and one low-angle inclined belt layer allows suppression of an increase in manufacturing costs and tire weight while maintaining noise performance.

In this embodiment, the low-angle inclined belt layer 163d is provided further outward in the tire radial direction than the high-angle inclined belt layer 163c. Alternatively, the low-angle inclined belt layer 163d may be provided further inward in the tire radial direction than the high-angle inclined belt layer 163c.

The inclination angle of the cords in the high-angle inclined belt layer 163c relative to the tire circumferential direction is 35° or more to 90° or less. The inclination angle of the cords in the high-angle inclined belt layer 163c relative to the tire circumferential direction is more preferably 50° or more. Like the first high-angle inclined belt layer 16a of Embodiment 1, the edge of the high-angle inclined belt layer 163c in the tire width direction is positioned further outward in the tire width direction than the circumferential main groove 14 disposed furthest outward in the tire width direction in the tread half portion bordered by the tire equator CL. Furthermore, like the first high-angle inclined belt layer 16a of Embodiment 1, the interval $W_5$ in the tire width direction from the edge of the high-angle inclined belt layer 163c in the tire width direction to the center of the circumferential main groove 14 disposed furthest outward in the tire width direction is $0.2W_1$ or more to $0.35W_1$ or less, where $W_1$ is the width of the high-angle inclined belt layer 163c in the tire width direction.

Accordingly, as in Embodiment 1, the cornering power increases and high turning performance is obtained under a variety of driving conditions in which the slip angle of the tire changes.

The inclination angle of the cords in the low-angle inclined belt layer 163d relative to the tire circumferential direction is smaller than the inclination angle of the cords in the high-angle inclined belt layer 163c and is 30° or less. The cords in the low-angle inclined belt layer 163d intersect the cords in the high-angle inclined belt layer 163c so as to sandwich the tire equator CL therebetween.

By providing the low-angle inclined belt layer 163d, the noise performance can be improved. This effect is described below.

As described above, a tire in which the cords in the high-angle inclined belt layer 163c have a large inclination angle relative to the tire circumferential direction has a shape (see the dash-double dot line in FIG. 5) such that the tread surface uniformly undergoes significant vibration in the high frequency range of 400 Hz to 2 kHz in the primary, secondary or ternary vibration modes in the cross-sectional direction, thereby causing a large noise emission. Therefore, setting the inclination angle of the cords in the low-angle inclined belt layer 163d relative to the tire circumferential direction to be smaller than the inclination angle of the cords in the high-angle inclined belt layer 163c and to be 30° or less maintains the out-of-plane bending stiffness in the tire circumferential direction at a suitable degree near the tire equator CL. As a result, the expansion of the tread surface in the tire radial direction is suppressed (see the dashed line in FIG. 5), and noise emission is reduced.

The inclination angle of the cords in the low-angle inclined belt layer 163d relative to the tire circumferential direction is preferably 10° or greater.

Setting the inclination angle of the cords in the low-angle inclined belt layer 163d to be 10° or greater relative to the tire circumferential direction allows the out-of-plane bending stiffness in the tire circumferential direction to be ensured without impeding the effect, produced by the high-angle inclined belt layer 163c, of ensuring the ground contact length.

The width $W_2$ of the low-angle inclined belt layer 163d in the tire width direction is preferably $0.6W_1$ or less, where $W_1$ is the width of the high-angle inclined belt layer 163c in the tire width direction.

By setting the width $W_2$ of the low-angle inclined belt layer 163d in the tire width direction to be $0.6W_1$ or less, the noise performance can be improved, the effect of improving the cornering power can be maintained, and the rolling resistance can be reduced. These effects are described below.

If the width in the tire width direction becomes too large in a region where the out-of-plane bending stiffness in the tire circumferential direction is high, the tread portion 11 tends to vibrate uniformly, and the effect of reducing noise emission is diminished. Therefore, setting the width $W_2$ of the low-angle inclined belt layer 163d in the tire width direction to be $0.6W_1$ or less suppresses induction of the mode in which the entire tread portion 11 vibrates, thereby improving the noise performance.

Furthermore, when the vehicle corners, cornering power is obtained by the surface of the tread portion 11 being pushed strongly against the road surface. Therefore, when the load placed on the tire is insufficient with respect to the rigidity in the tire circumferential direction, the surface of the tread portion 11 is not sufficiently pressed against the road surface. As a result, the shoulder region of the tread portion 11 may be lifted up from the road surface, which reduces the effect of increasing cornering power. By setting the width $W_2$ of the low-angle inclined belt layer 163d in the tire width direction to be $0.6W_1$ or less, the rigidity in the tire circumferential direction in the shoulder region of the tread portion 11 can be appropriately reduced, and the phenomenon whereby the tread portion 11 is lifted up can be suppressed. The effect of increasing cornering power is thus maintained.

Furthermore, by setting the width $W_2$ of the low-angle inclined belt layer 163d in the tire width direction to be $0.6W_1$ or less, the tire weight is reduced, and the rolling resistance of the pneumatic tire 103 can be lessened.

The width $W_2$ of the low-angle inclined belt layer 163d in the tire width direction is preferably $0.25W_1$ or greater.

According to this structure, the belt rigidity is sufficiently guaranteed near the tire equator CL. Therefore, expansion of the tread portion 11 in the tire circumferential direction can be suppressed, noise emission can be reduced, and cornering power can be reliably increased.

EXAMPLES

Next, the cornering power, noise performance, and rolling resistance were evaluated for tires according to this disclosure and Comparative Example Tires, as described below. In the evaluation, Comparative Examples 1 to 4 and Examples 1 to 4 were compared.

Comparative Examples 1 to 3 have a similar structure to that of the pneumatic tire of Embodiment 1 (see FIG. 1). Comparative Example 1 differs from the structure of the pneumatic tire of Embodiment 1, however, in that the inclination angle of the cords in the inclined belt layers relative to the tire circumferential direction is small, and the interval from the edge of the wide inclined belt layer (the first high-angle inclined belt layer in Embodiment 1) to the circumferential main groove is less than 0.2 times the width of the wide inclined belt layer in the tire width direction. Comparative Example 2 differs from the structure of the pneumatic tire of Embodiment 1 in that the interval from the edge of the wide inclined belt layer to the circumferential main groove is less than 0.2 times the width of the wide inclined belt layer in the tire width direction. Comparative Example 3 differs from the structure of the pneumatic tire in Embodiment 1 in that the interval from the edge of the wide inclined belt layer to the circumferential main groove is over 0.35 times the width of the wide inclined belt layer in the tire width direction.

Example 1 corresponds to the pneumatic tire of Embodiment 1 (see FIG. 1). Example 2 corresponds to the pneumatic tire of Embodiment 2 (see FIG. 4). Example 3 corresponds to the pneumatic tire of Embodiment 3 (see FIG. 6). Example 4 corresponds to the pneumatic tire of Embodiment 5 (see FIG. 8). Example 5 has a similar structure to that of the pneumatic tire of Embodiment 5 (see FIG. 8). Example 5 differs from the structure of the pneumatic tire of Embodiment 5, however, in that the width of the narrow inclined belt layer (the low-angle inclined layer in Embodiment 5) in the tire width direction is over 0.6 times the width of the wide inclined belt layer (the high-angle inclined belt layer in Embodiment 5) in the tire width direction.

The results for the pneumatic tires in Comparative Examples 1 to 3 and Examples 1 to 5 are listed in Table 1.

TABLE 1

|  | Comparative Example 1 | Comparative Example 2 | Comparative Example 3 | Example 1 | Example 2 | Example 3 | Example 4 | Example 5 |
|---|---|---|---|---|---|---|---|---|
| Tire size | | | | 165/60R19 | | | | |
| Rim size | | | | 5.5J-19 | | | | |
| Internal pressure [kPa] | | | | 300 | | | | |
| Presumed LI | | | | 87 | | | | |
| Ground contact width [mm] | | | | 125 | | | | |
| Inclined belt | | | | | | | | |
| Wide inclined belt layer | included | included | included | included | included | included | included | included |
| inclination angle*1 | 28° | 60° | 60° | 60° | 60° | 60° | 60° | 60° |
| width $W_1$ [mm] | 135 | 135 | 135 | 135 | 135 | 135 | 135 | 135 |
| Narrow inclined belt layer | included | included | included | included | included | included | included | included |
| inclination angle*1 | 28° | 60° | 60° | 16° | 60° | 60° | 16° | 16° |
| width $W_2$ [mm] | 130 | 130 | 130 | 85 | 130 | 130 | 65 | 85 |
| $W_2/W_1$ | 0.96 | 0.96 | 0.96 | 0.63 | 0.96 | 0.96 | 0.48 | 0.63 |
| Circumferential belt | | | | | | | | |
| Circumferential belt layer 1 | included | included | included | included | included | included | included | included |
| Young's modulus [GPa] | 10 | 10 | 10 | 10 | 10 | 10 | 10 | 10 |
| number of layers | 1 | 1 | 1 | 1 | 1 | 1 | 1 | 1 |
| number of cords implanted [per 50 mm] | 50 | 50 | 50 | 50 | 50 | 50 | 50 | 50 |
| parameter X*2 | 500 | 500 | 500 | 500 | 500 | 500 | 500 | 500 |
| width [mm] | 128 | 128 | 128 | 128 | 128 | 79 | 128 | 128 |
| cord material | nylon | nylon | nylon | nylon | nylon | nylon | nylon | nylon |
| Circumferential belt layer 2 | — | — | — | — | included | included | — | — |
| Young's modulus [GPa] | — | — | — | — | 19 | 10 | — | — |
| number of layers | — | — | — | — | 1 | 1 | — | — |
| number of cords implanted [per 50 mm] | — | — | — | — | 50 | 50 | — | — |
| parameter X*2 | — | — | — | — | 950 | 500 | — | — |
| width [mm] | — | — | — | — | 30 | 79 | — | — |
| cord material | — | — | — | — | hybrid cords | nylon | — | — |
| width $W_4$ of high-rigidity region [mm] | — | — | — | — | 30 | 30 | — | — |
| total width $W_3$ of circumferential belt [mm] | | | | 128 | | | | |
| $W_4/W_3$ | — | — | — | — | 0.23 | 0.23 | — | — |
| Position of circumferential main groove $W_5$ [mm]*3 | 20 | 20 | 50 | 30 | 30 | 30 | 30 | 30 |
| $W_5/W_1$ | 0.15 | 0.15 | 0.37 | 0.22 | 0.22 | 0.22 | 0.22 | 0.22 |

Note the following in Table 1.

*1 is the inclination angle of the cords relative to the tire circumferential direction.

*2 is parameter X, which is the product of Young's modulus, the number of layers, and the number of cords implanted.

*3 represents the position of the circumferential main groove disposed furthest outward in the tire width direction as the interval, in the tire width direction, from the edge of the wide inclined belt layer in the tire width direction to the center of the circumferential main groove in the tire width direction.

<Test to Evaluate Cornering Power>

The tires of Comparative Examples 1 to 3 and Examples 1 to 5 with the specifications listed in Table 1 were produced, assembled onto an applicable rim, mounted on a vehicle, and measured in a flat-belt cornering tester. At a belt speed of 100 km/h, the cornering force was measured when the slip angle (SA) between the rolling direction of the tire and the circumferential direction of the drum was 1° and 3°. The results are listed in Table 2.

The results were converted into an index, with the cornering force of Comparative Example 1 being 100. A larger index indicates better cornering force at each slip angle, i.e. better cornering power at each slip angle.

<Test to Evaluate Noise Performance>

The tires of Comparative Examples 1 to 3 and Examples 1 to 5 with the specifications listed in Table 1 were produced, assembled onto an applicable rim, mounted on a vehicle, and placed on a running test drum, which was rotated at a speed of 100 km/h to measure the noise level with a traveling microphone method. The results are listed in Table 2.

The results were evaluated as the difference in noise level, taking the noise level of Comparative Example 1 as a standard. A lower value indicates a better effect of noise reduction.

<Test to Evaluate Rolling Resistance>

The tires of Comparative Examples 1 to 3 and Examples 1 to 5 with the specifications listed in Table 1 were produced, assembled onto an applicable rim, mounted on a vehicle, and placed on a running test drum, which was rotated at a speed of 100 km/h to measure the rolling resistance and calculate the rolling resistance coefficient (RRC). The results are listed in Table 2.

The results were converted into an index based on the inverse of the rolling resistance coefficient of Comparative Example 1. A higher value indicates better rolling resistance.

TABLE 2

|  | Comparative Example 1 | Comparative Example 2 | Comparative Example 3 | Example 1 | Example 2 | Example 3 | Example 4 | Example 5 |
|---|---|---|---|---|---|---|---|---|
| Cornering force | | | | | | | | |
| SA = 1° | 100 | 95 | 103 | 103 | 103 | 103 | 103 | 103 |
| SA = 3° | 100 | 105 | 98 | 105 | 105 | 105 | 105 | 105 |
| Noise performance | 0 dB | +3 dB | +3 dB | +3 dB | +1 dB | +1 dB | +1 dB | +3 dB |
| RRC | 100 | 100 | 100 | 100 | 100 | 100 | 110 | 105 |

<Test to Evaluate Cornering Power>

As illustrated in the cornering force lines in Table 2, a comparison between Examples 1 to 5 and Comparative Examples 2 and 3 shows that the cornering force increased over Comparative Example 1 both when the slip angle was 1° and 3°. Accordingly, it is clear that if the inclination angle relative to the tire circumferential direction is 35° or more to less than 90°, and $0.2W_1 \leq W_5 \leq 0.35 W_1$, then the cornering power increases for both slip angles of 1° and 3°.

<Results of Noise Evaluation>

As illustrated in the noise performance line in Table 2, a comparison between Example 1 and Examples 2 and 3 shows that the noise performance was better for Examples 2 and 3 than for Example 1. It was thus shown that the noise performance improves by using the circumferential belt to form the high-rigidity region. Furthermore, a comparison between Example 1 and Example 4 shows that the noise performance was better for Example 4 than for Example 1. It was thus shown that the noise performance improves by providing the low-angle inclined belt layer in which the cords are at an inclination angle that is smaller than the inclination angle of the cords in the high-angle inclined belt layer and is 30° or less relative to the tire circumferential direction.

<Results of Rolling Resistance Evaluation>

As illustrated in the RRC line in Table 2, a comparison between Example 5 and Example 4 shows that the rolling resistance performance was better for Example 4 than for Example 5. It was thus shown that the rolling resistance performance improves if $W_2 \leq 0.6W_1$.

REFERENCE SIGNS LIST 10, 100, 101, 102, 103 Pneumatic tire
11 Tread portion
12 Sidewall portion
13 Bead portion
14 Circumferential main groove
15 Carcass
16, 163 Inclined belt
16a First high-angle inclined belt layer
16b Second high-angle inclined belt layer
163c High-angle inclined belt layer
163d Low-angle inclined belt layer
17, 170, 171, 172 Circumferential belt
170a Wide circumferential belt layer
170b Narrow circumferential belt layer
171c First circumferential belt layer
171d Second circumferential belt layer
18 Shoulder land portion
C Central region
CL Tire equator
R Applicable rim

The invention claimed is:

1. A pneumatic tire comprising:
a pair of bead portions;
a tread portion;
a carcass extending between the pair of bead portions;
an inclined belt provided at an outer side of a crown portion of the carcass in a tire radial direction and consisting of only one high-angle inclined belt layer and only one low-angle inclined belt layer each including cords that are inclined relative to a tire circumferential direction; and
a circumferential belt provided at the outer side of the crown portion of the carcass in the tire radial direction and formed by one or more circumferential belt layers including cords that extend along the tire circumferential direction; wherein
one or more circumferential main grooves extending along the tire circumferential direction are formed on a surface of the tread portion;
the cords of the high-angle inclined belt layer are at an inclination angle of 35° or more to 90° or less relative to the tire circumferential direction;
the cords of the low-angle inclined belt layer are at an inclination angle of 10° or more to 30° or less relative to the tire circumferential direction;
in at least one tread half portion, an edge of the high-angle inclined belt layer in a tire width direction is positioned further outward in the tire width direction than a circumferential main groove disposed furthest outward in the tire width direction, and an interval in the tire width direction from the edge to a center of the circumferential main groove is $0.2W_1$ or more to $0.35W_1$ or less, where W1 is a width of the high-angle inclined belt layer in the tire width direction; and
the width $W_1$ of the high-angle inclined belt layer in the tire width direction is greater than a ground contact width of the tread portion.

2. The pneumatic tire of claim 1, wherein the circumferential belt has a higher tire circumferential direction rigidity per unit width in a central region including a tire equator than in a region on an outer side of the central region in the tire width direction.

3. The pneumatic tire of claim 2, comprising two of the circumferential belt layers in the central region and one of the circumferential belt layers in a region on an outer side of the central region in the tire width direction.

4. The pneumatic tire of claim 1, wherein
a width of the low-angle inclined belt layer in the tire width direction is $0.6W_1$ or less.

5. The pneumatic tire of claim 1, wherein X is 700 or less when X=Ymn, where Y is Young's modulus of the cords in the one or more circumferential belt layers in GPa, m is the number of layers of the one or more circumferential belt layers, and n is the number of cords implanted per 50 mm.

6. The pneumatic tire of claim 1, wherein the circumferential belt includes a wide circumferential belt layer and a narrow circumferential belt layer as the circumferential belt layers, and the narrow circumferential belt layer is disposed further outward in the tire radial direction than the wide circumferential belt layer.

7. The pneumatic tire of claim 6, wherein the interval from the edge of the wide circumferential belt layer in the tire width direction to the edge of the high-angle inclined belt layer in the tire width direction is 5 mm or greater.

8. The pneumatic tire of claim 2, wherein a width $W_4$ in the tire width direction of the central region is $0.2W_3$ or more to $0.6W_3$ or less, where $W_3$ is the width of the circumferential belt in the tire width direction.

9. The pneumatic tire of claim 6, wherein the wide circumferential belt layer has a smaller width in the tire width direction than that of the high-angle inclined belt layer.

10. The pneumatic tire of claim 6, wherein the wide circumferential belt layer has a larger width in the tire width direction than that of the high-angle inclined belt layer.

11. The pneumatic tire of claim 4, wherein the low-angle inclined belt layer is provided further outward in the tire radial direction than the high-angle inclined belt layer.

12. The pneumatic tire of claim 4, wherein the low-angle inclined belt layer is provided further inward in the tire radial direction than the high-angle inclined belt layer.

\* \* \* \* \*